United States Patent
Chen

(10) Patent No.: US 7,800,705 B2
(45) Date of Patent: Sep. 21, 2010

(54) LIQUID CRYSTAL DISPLAY HAVING ELECTRICALLY FLOATING THIN FILM TRANSISTOR WITHIN SUB PIXEL UNIT

(75) Inventor: Hung-Yu Chen, Miao-Li (TW)

(73) Assignee: Chimei Innolux Corporation, Miao-Li County (TW)

( * ) Notice: Subject to any disclaimer, the term of this patent is extended or adjusted under 35 U.S.C. 154(b) by 131 days.

(21) Appl. No.: 12/228,709

(22) Filed: Aug. 15, 2008

(65) Prior Publication Data

US 2009/0046216 A1 Feb. 19, 2009

(30) Foreign Application Priority Data

Aug. 15, 2007 (CN) .......................... 2007 1 0075773

(51) Int. Cl.
*G02F 1/136* (2006.01)
(52) U.S. Cl. .......................................... 349/48; 349/46
(58) Field of Classification Search .................. 349/46, 349/48
See application file for complete search history.

(56) References Cited

U.S. PATENT DOCUMENTS

| | | | |
|---|---|---|---|
| 7,138,656 B2 * | 11/2006 | Yu et al. ........................ | 257/59 |
| 7,554,622 B2 * | 6/2009 | Nakanishi et al. .............. | 349/48 |
| 7,671,932 B2 * | 3/2010 | Ohta et al. ....................... | 349/55 |
| 2003/0179323 A1 * | 9/2003 | Abileah et al. ................. | 349/24 |
| 2005/0134751 A1 * | 6/2005 | Abileah et al. ................. | 349/42 |
| 2007/0008444 A1 * | 1/2007 | Nakanishi et al. .............. | 349/43 |
| 2007/0035691 A1 * | 2/2007 | Sugiura et al. ............... | 349/187 |
| 2008/0007506 A1 * | 1/2008 | Chen et al. .................... | 345/92 |
| 2009/0174836 A1 * | 7/2009 | Yoo et al. ....................... | 349/48 |
| 2009/0195725 A1 * | 8/2009 | Kim et al. ....................... | 349/48 |

FOREIGN PATENT DOCUMENTS

CN 1621928 A 6/2005

* cited by examiner

*Primary Examiner*—K. Cyrus Kianni
(74) *Attorney, Agent, or Firm*—Wei Te Chung

(57) ABSTRACT

An LCD includes data lines, gate lines intersecting with the data lines, and pixel units. Each pixel unit is defined by a minimal area formed by two adjacent data lines and two adjacent gate lines. Each pixel unit includes a first sub pixel unit and a second sub pixel unit. The first sub pixel unit includes a first thin film transistor (TFT) and a first pixel electrode. The second sub pixel unit includes a second TFT and a second pixel electrode. A gate electrode of the first TFT is connected to the gate line, a source electrode of the first TFT is connected to the data line. A source electrode of the second TFT is connected to a same data line, and a gate electrode of the second TFT is electrically floating.

7 Claims, 5 Drawing Sheets

LIQUID CRYSTAL DISPLAY HAVING ELECTRICALLY FLOATING THIN FILM TRANSISTOR WITHIN SUB PIXEL UNIT

CROSS-REFERENCE TO RELATED APPLICATION

This application is related to, and claims the benefit of, a foreign priority application filed in China as Serial No. 200710075773.6 on Aug. 15, 2007. The related application is incorporated herein by reference.

FIELD OF THE INVENTION

The present invention relates to liquid crystal displays (LCDs), and particularly, to a multi-domain vertical alignment LCD having an electrically floating thin film transistor within a sub pixel unit.

GENERAL BACKGROUND

LCD devices have been widely used in various portable information products such as notebooks, personal digital assistants, and video cameras, because of its portability, low power consumption, and low radiation. LCD devices are poised to completely replace cathode ray tube monitors and televisions.

Referring to FIG. 4 and FIG. 5, a typical multi-domain vertical alignment mode LCD 100 includes a plurality of parallel gate lines 101, a plurality of parallel first data lines 103 intersecting with the gate lines 101, a plurality of second data lines 105 parallel to the first data lines 103, a plurality of first thin film transistors (TFTs) 111 positioned adjacent to the intersection of the gate lines 101 and the first data lines 103, a plurality of second TFTs 121 positioned adjacent to the intersection of the gate lines 101 and the second data lines 105, a plurality of first pixel electrodes 113, a plurality of second pixel electrodes 123, a plurality of common electrodes 107 corresponding to the first pixel electrodes 113 and the second pixel electrodes 123, a plurality of first storage capacitors 115, and a plurality of second storage capacitors 125.

Each first TFTs 111 includes a gate electrode (not labeled) connected to a corresponding gate line 101, a source electrode (not labeled) connected to a corresponding first data line 103, and a drain electrode (not labeled) connected to a corresponding first pixel electrode 113. Each second TFTs 121 includes a gate electrode (not labeled) connected to a corresponding gate line 101, a source electrode (not labeled) connected to a corresponding second data line 105, and a drain electrode (not labeled) connected to a corresponding second pixel electrode 123.

Each first pixel electrode 113 and the corresponding common electrode 107 constitute a first liquid crystal capacitor 117. Each second pixel electrode 123 and the corresponding common electrode 107 constitute a second liquid crystal capacitor 127. The first liquid crystal capacitor 117 and the first capacitor 115 are connected in parallel. The second liquid crystal capacitor 127 and the second capacitor 125 are connected in parallel.

Each first TFT 111, the corresponding first capacitor 115, and the corresponding first liquid crystal capacitor 117 cooperatively define a first sub pixel unit 110. Each second TFT 121, the corresponding second capacitor 125, and the corresponding second liquid crystal capacitor 127 cooperatively define a second sub pixel unit 120. The first and second sub pixel units 110, 120 cooperatively constitute a pixel 130. In another aspect, each pixel 130 is a region substantially defined by two adjacent gate lines 101 crossing over a first data line 103 and an adjacent second data line 105.

The gate lines 101 are configured for applying a plurality of scanning signals to the first and second TFTs 111, 121 in order to switch on or switch off the corresponding first and second TFTs 111, 121. The first data lines 103 are configured for applying a plurality of first gray scale voltages to the first TFTs 111. The second data lines 105 are configured for applying a plurality of second gray scale voltages to the second TFTs 121. Display performance of the LCD 100 is enhanced by applying first gray scale voltages to the first sub pixel units 110 and applying second gray scale voltages to the second sub pixel units 120.

However, a layout of the first and second data lines 103, 105 is complicated because the first sub pixel unit 110 and the second sub pixel unit 120 are supplied with gray scale voltages from the first data line 103 and the second data lines 105, respectively. In addition, the LCD 100 needs more data driving chips, thereby driving the cost of the LCD 100.

What is needed, therefore, is an LCD that can overcome the above-described deficiencies.

SUMMARY

An LCD includes a plurality of data lines, a plurality of gate lines intersecting with the data lines, and a plurality of pixel units. Each pixel unit is surrounded by two data lines and two gate lines. Each pixel unit includes a first sub pixel unit and a second sub pixel unit. The first sub pixel unit includes a first thin film transistor (TFT) and a first pixel electrode. The second sub pixel unit includes a second TFT and a second pixel electrode. A gate electrode of the first TFT is connected to the gate line, a source electrode of the first TFT is connected to the data line, and a drain electrode of the first TFT is connected to the first pixel electrode. A source electrode of the second TFT is connected to a same data line, a drain electrode of the second TFT is connected to the second pixel electrode, and a gate electrode of the second TFT is electrically floating.

Other novel features and advantages of the present LCD will become more apparent from the following detailed description when taken in conjunction with the accompanying drawings.

BRIEF DESCRIPTION OF THE DRAWINGS

Many aspects can be better understood with reference to the following drawings. The components in the drawings are not necessarily drawn to scale, the emphasis instead being placed upon clearly illustrating the principles of the embodiments. Moreover, in the drawings, like reference numerals designate corresponding parts throughout the several views.

DETAILED DESCRIPTION OF THE EMBODIMENTS

Reference will now be made to the figures to describe various embodiments of the invention in detail.

Figure 1:
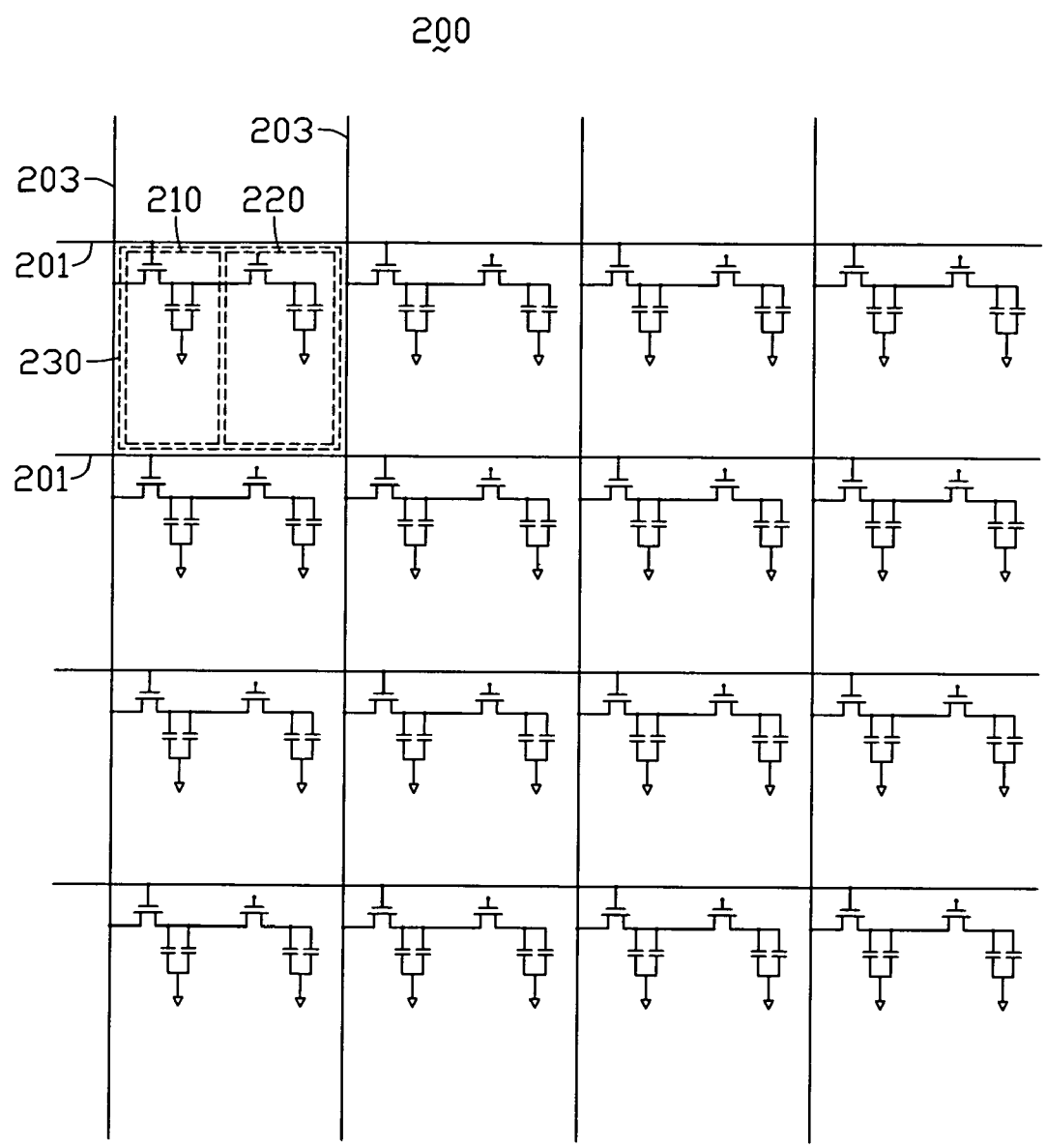
FIG. 1 is a circuit diagram of a first embodiment of an LCD, the LCD including a plurality of gate lines, a plurality of data lines, and a plurality of pixel units.

Referring to FIG. 1, a circuit diagram of a first embodiment of an LCD 200 includes a plurality of gate lines 201, a plurality of data lines 203, and a plurality of pixel units 230. The plurality of gate lines 201 are substantially parallel to each other. The plurality of data lines 203 are substantially parallel to each other, and substantially perpendicular to the gate lines 201. Two nearby gate lines 201 and two nearby data lines 203 surround each pixel unit 230.

Figure 2:
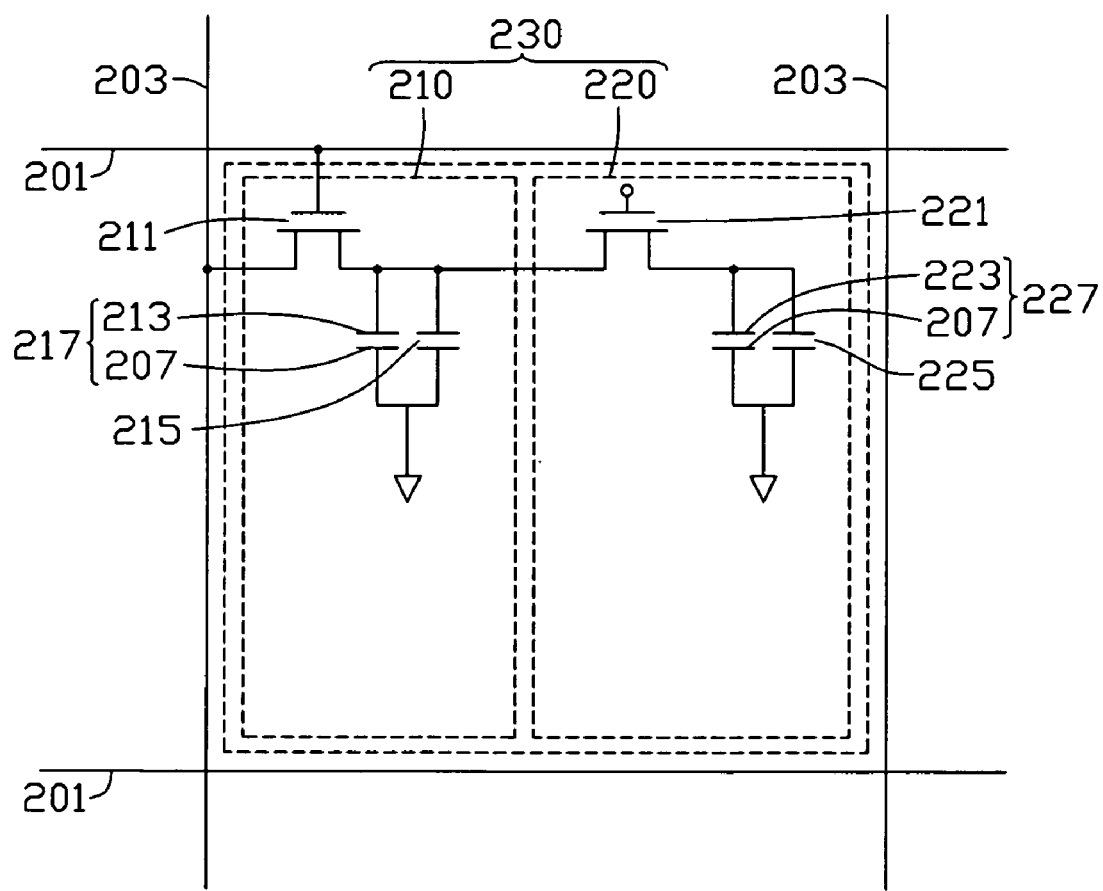
FIG. 2 is an enlarged circuit diagram of one pixel unit of the LCD of FIG. 1.

Referring also to FIG. 2, each pixel unit 230 includes a first sub pixel unit 210 and a second sub pixel unit 220. Each first sub pixel unit 210 includes a first TFT 211, a first storage capacitor 215 and a first liquid crystal capacitor 217 comprising a first pixel electrode 213, a common electrode 207, and a liquid crystal (not shown) sandwiched between the first pixel electrode 213 and the common electrode 207. Each second sub pixel unit 220 includes a second TFT 221, a second storage capacitor 225, and a second liquid crystal capacitor 227 comprising a second pixel electrode 223, the common electrode 207, and a liquid crystal sandwiched between the second pixel electrode 223 and the common electrode 207.

Each first TFT 211 includes a first gate electrode (not labeled), a first source electrode (not labeled), and a first drain electrode (not labeled). Each second TFT 221 includes a second gate electrode (not labeled), a second source electrode (not labeled), and a second drain electrode (not labeled). Each first gate electrode is connected to an adjacent gate line 201. Each first source electrode is connected to an adjacent data line 203. Each first drain electrode is connected to the corresponding first pixel electrode 213. Each second source electrode is connected to the corresponding first drain electrode. In another embodiment, the second source electrode may be connected to the adjacent data line 201. Each second drain electrode is connected to the corresponding second pixel electrode 223. The second gate electrode is floating (i.e., the second gate electrode is not connected).

In operation, scanning signals are provided sequentially to the gate lines 201. When one of the gate lines 201 is scanned, the first TFTs 211 connected thereto are turned on so that the data lines 203 provide gray scale voltages to the first pixels electrodes 213 via the first TFTs 211. The first liquid crystal capacitor 217 and the first storage capacitor 215 are charged by the gray scale voltages.

Simultaneously, the gray scale voltage is applied to the second source electrode of the second TFT 221. The second TFT 221 is turned off because the second gate electrode of the second TFT 221 is floating. Thus, an impedance value between the second source electrode and the second drain electrode of the second TFT 221 is much greater than an impedance value of the first TFT 211. Hence, a charging current for the second liquid crystal capacitor 227 and the second storage capacitor 225 is much less than a charging current for the first liquid crystal capacitor 217 and the first storage capacitor 215. After the gate line 201 is scanned, the second pixel electrode 223 gains a gray scale voltage less than that of the first pixel electrode 213. The gray scale voltages are maintained to realize a display of images until the gate line 201 is scanned again at a next frame period.

Unlike conventional LCDs, one of the data lines 203 provides the gray scale voltage to the first pixel electrode 213 and the second electrode 223. In other words, the first sub pixel unit 210 and the second sub pixel unit 220 are driven by a single data line 203, thereby simplifying a layout of the data lines 203. In addition, the second sub pixel unit 220 gains a gray scale voltage different from that of the first pixel unit 210 because the second TFT is floating. In another embodiment, the second source electrode of the second TFT 221 can be connected to the data line 203 other than the first drain electrode of the first TFT 211.

A parasitical capacitor generally exists between the gate electrode and the source electrode of the TFTs 211, 221. A voltage potential of the gate electrode changes as the voltage potential of the source electrode changes. Accordingly, an impedance value between the source electrode and the drain electrode changes. In other words, the voltage potential of the source electrode is inversely proportional to the impedance value between the source electrode and the drain electrode.

The gray scale voltage provided to the source electrode of the second TFT 221 is high and the impedance value between the source electrode and the drain electrode is low when the pixel unit 230 is displaying a white image, for a normally-black LCD. A charging current for the second sub pixel unit 220 is relatively great, or even equal to a charging current for the first sub pixel unit 210. The second sub pixel unit 220 can reach a gray scale voltage nearly equal to that of the first sub pixel unit 210. Therefore, the pixel unit 230 can still display a complete white image.

The gray scale voltage provided to the source electrode of the second TFT 221 is low and the impedance value between the source electrode and the drain electrode is great when the pixel unit 230 displays a black image. A charging current for the second sub pixel unit 220 is relatively small, or even equal to 0 Ampere (A). Thus, the second sub pixel unit 220 may display a blacker image than the first sub pixel unit 210. Therefore, the pixel unit 230 may display a relatively blacker image. In summary, the LCD 200 may have good performance in contrast ratio.

Figure 3:
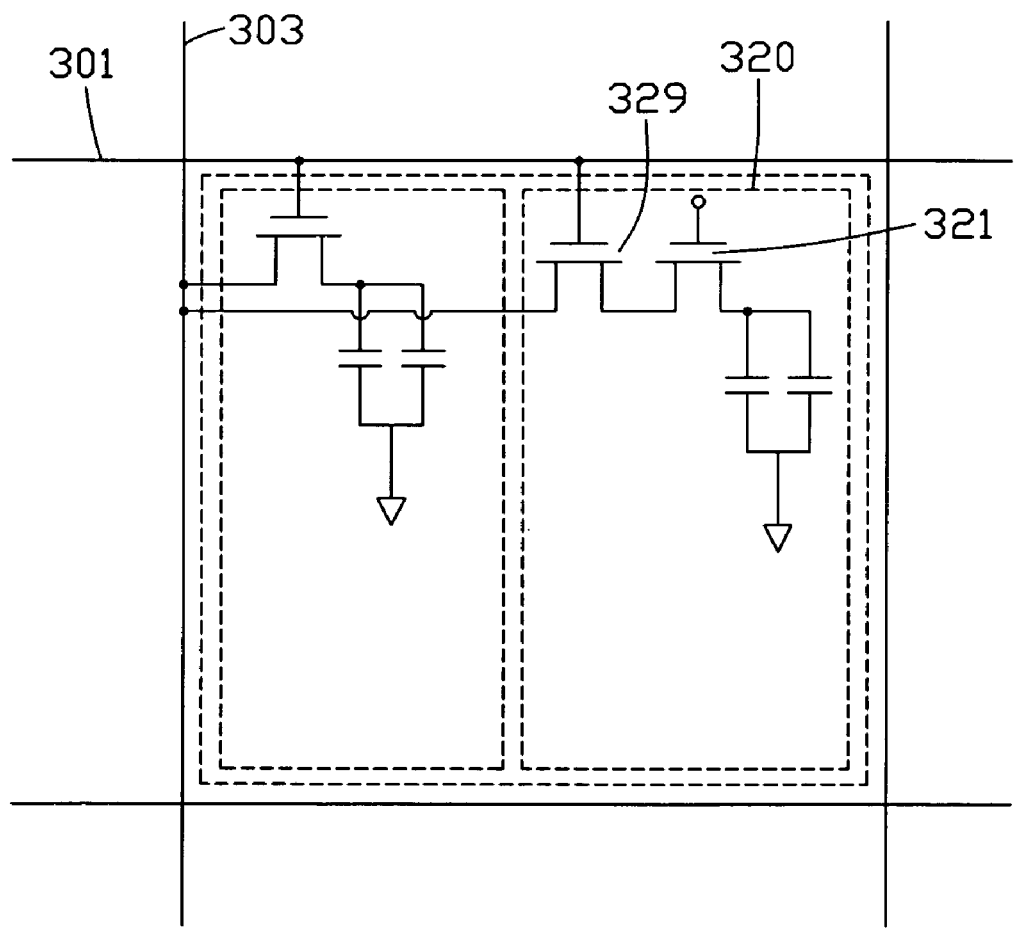
FIG. 3 is an enlarged circuit diagram of one pixel unit of a second embodiment of an LCD.
Figure 4:
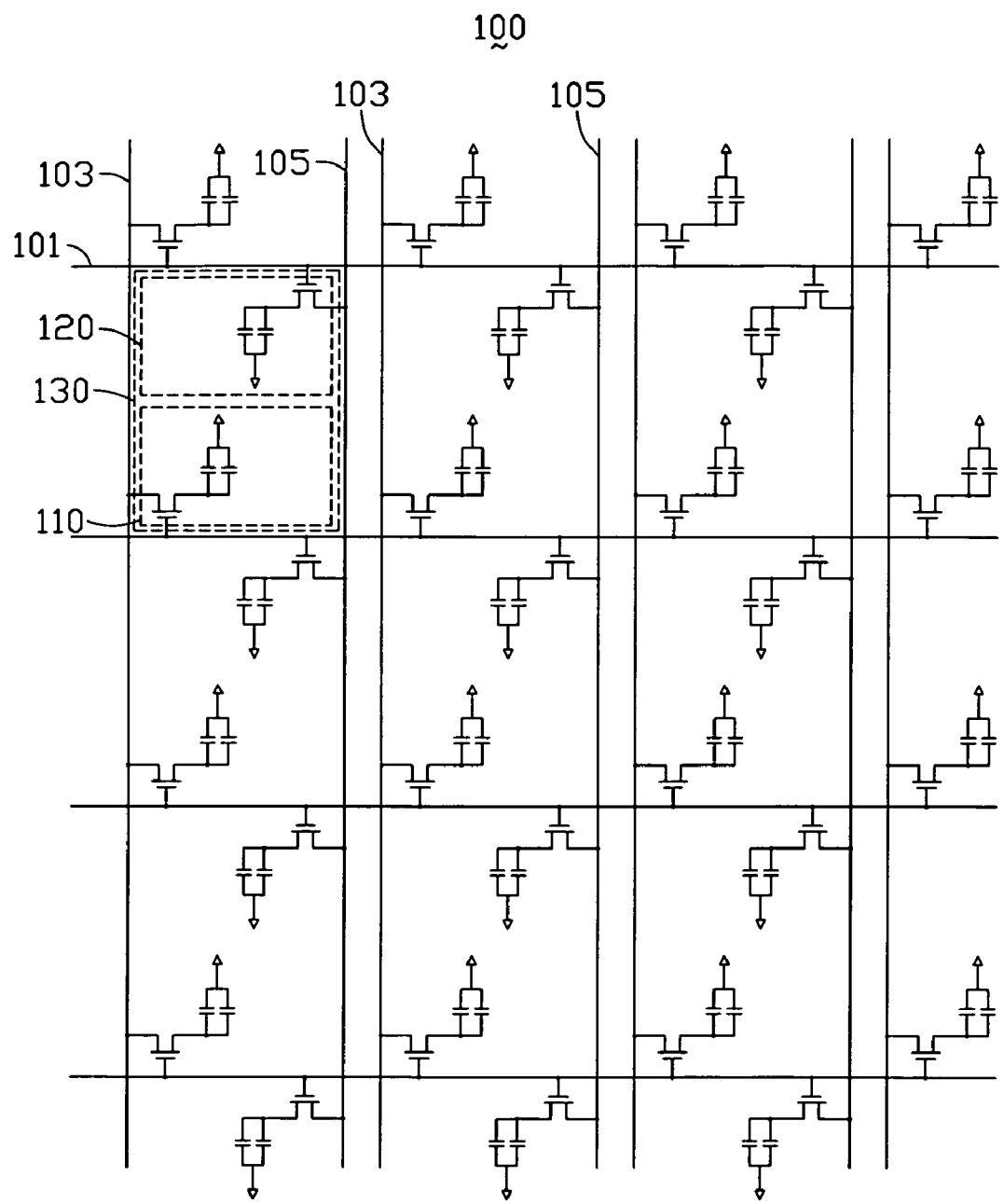
FIG. 4 is a circuit diagram of a typical multi-domain vertical alignment (MVA) mode LCD.
Figure 5:
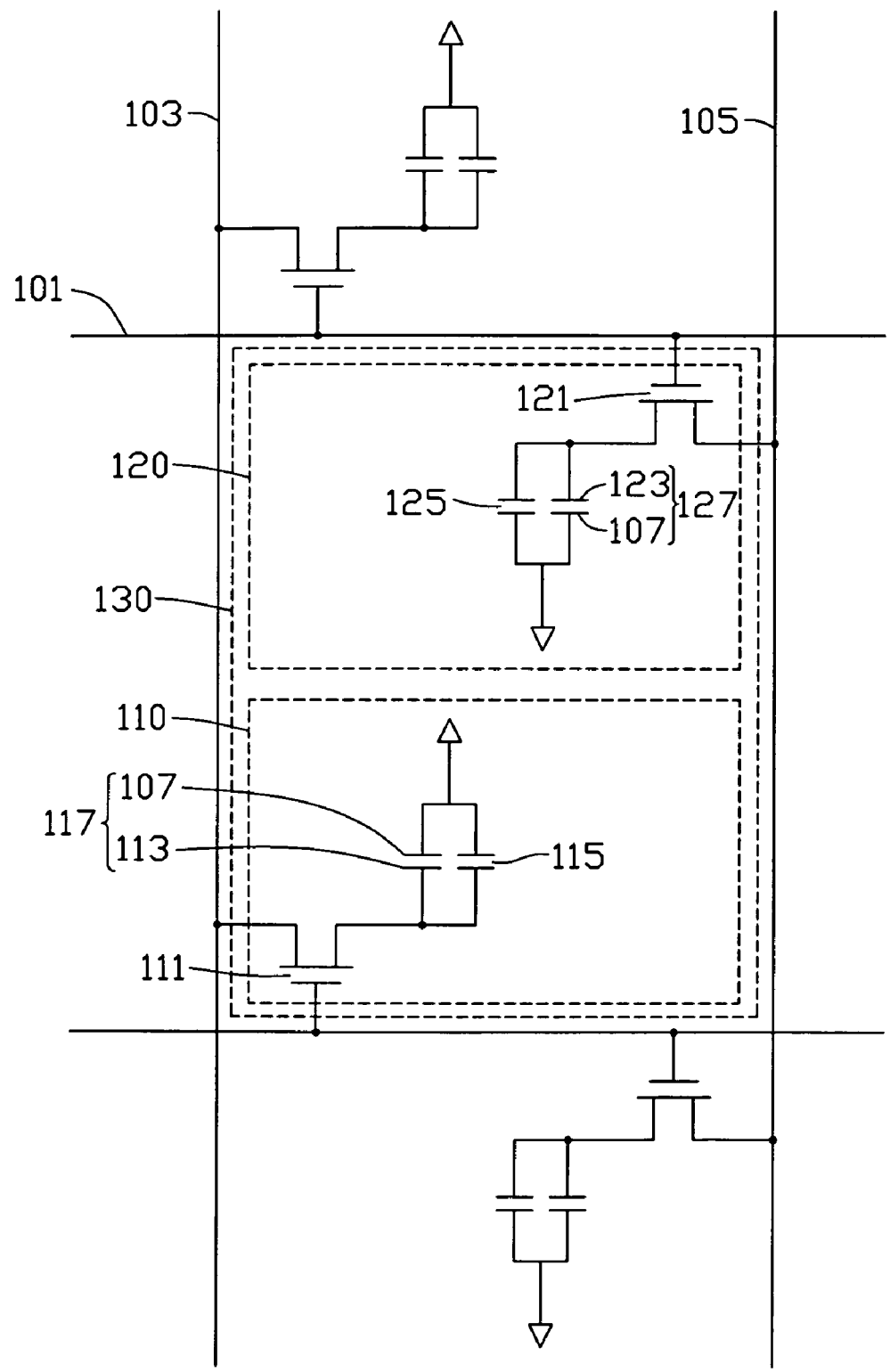
FIG. 5 is an enlarged circuit diagram of one pixel unit of FIG. 4.

Referring to FIG. 3, a second embodiment of an LCD is similar to the LCD 200, except a second sub pixel unit 320 further includes a third TFT 329. A second source electrode of a second TFT 321 is connected to a third drain electrode of the third TFT 329. A third gate electrode of the third TFT 329 is connected to a gate line 301. A third source electrode of the third TFT 329 is connected to a data line 303. The third TFT 329 is configured for controlling whether a gray scale voltage is provided to the second pixel electrode via the second TFT 321. The embodiment of FIG. 3 has advantages similar to those of the LCD 200 of FIG 1. In another embodiment, the third source electrode of the third TFT 329 can be connected to the drain electrode of the first TFT other than the data line 303.

It is to be understood, however, that even though numerous characteristics and advantages of the present embodiments have been set out in the foregoing description, together with details of the structures and functions of the embodiments, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A liquid crystal display (LCD), comprising:
a plurality of data lines;
a plurality of gate lines intersecting the data lines; and
a plurality of pixel units, each pixel unit being at least partially surrounded by an adjacent data line adjacent to a side of the pixel unit and an adjacent gate line adjacent to another side of the pixel unit, each pixel unit comprising:
a first sub pixel unit comprising:
a first pixel electrode; and
a first thin film transistor (TFT) having a first gate electrode connected to the adjacent gate line, a first source electrode connected to the adjacent data line, and a first drain electrode connected to the first pixel electrode; and a second sub pixel unit comprising:

a second pixel electrode; and a second TFT having a second source electrode coupling to the adjacent data line, a second drain electrode connected to the second pixel electrode, and a second gate electrode electrically floating.

2. The LCD of claim 1, wherein each second sub pixel unit further comprises a third TFT having a third gate electrode connected to the adjacent gate line, a third source electrode connected to the adjacent data line, and a third drain electrode connected to the second source electrode.

3. The LCD of claim 1, wherein each first sub pixel unit further comprises a common electrode and liquid crystal sandwiched between the common electrode and the first pixel electrode, wherein the common electrode, the liquid crystal, and the first pixel electrode constitute a first liquid crystal capacitor.

4. The LCD of claim 3, wherein each first sub pixel unit further comprises a first storage capacitor electrically connected to the first liquid crystal capacitor in parallel.

5. The LCD of claim 3, wherein each second sub pixel unit further comprises a common electrode, and liquid crystal sandwiched between the common electrode and the second pixel electrode, wherein the common electrode, the liquid crystal, and the second pixel electrode constitute a second liquid crystal capacitor.

6. The LCD of claim 5, wherein each second sub pixel unit further comprises a second storage capacitor electrically connected to the second liquid crystal capacitor in parallel.

7. The LCD of claim 1, wherein the second source electrode is connected to the first drain electrode so as to couple to the adjacent data line via the first TFT.

* * * * *